Patented July 5, 1949

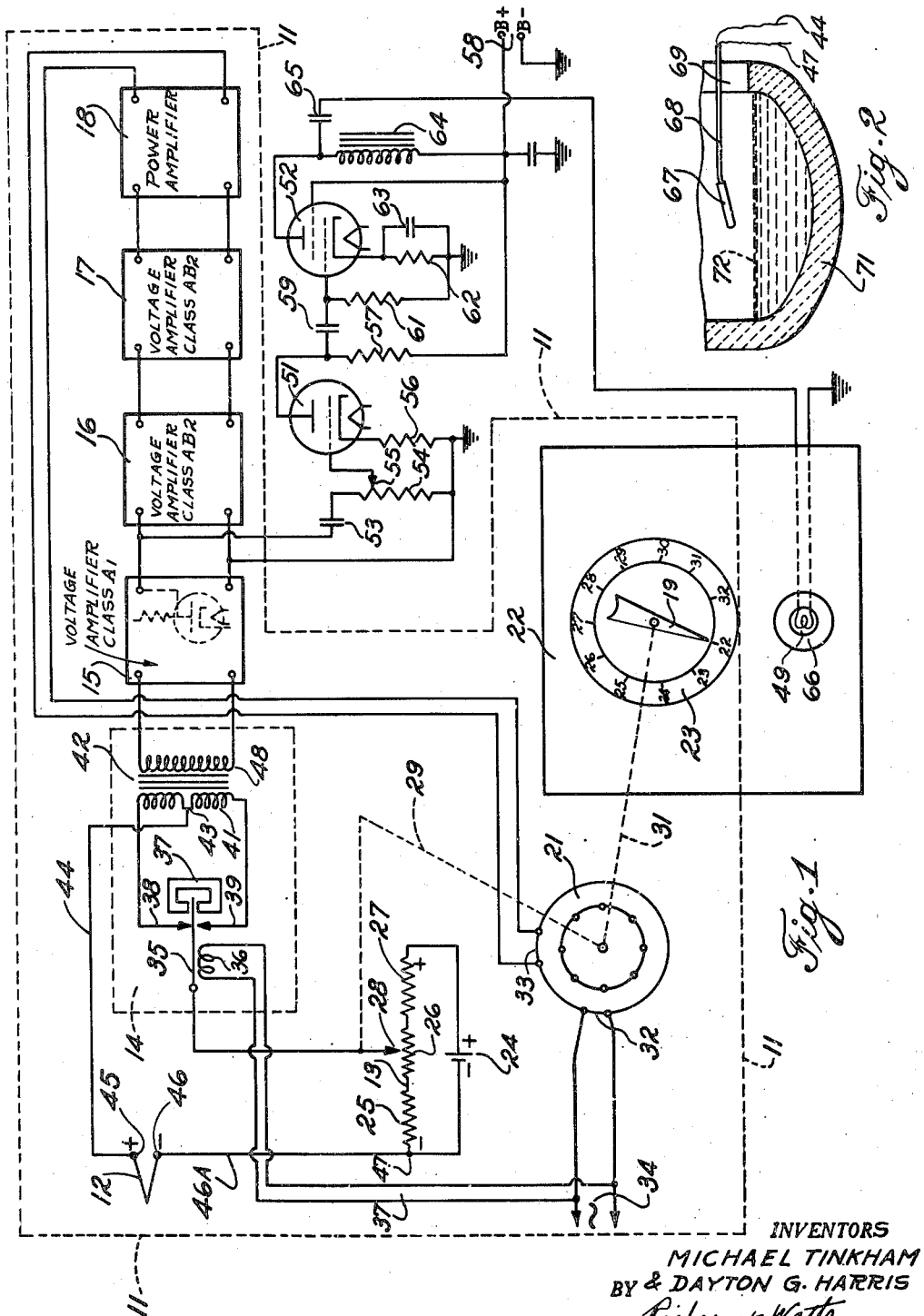

2,475,362

UNITED STATES PATENT OFFICE 2,475,362

ELECTRONIC PILOT LIGHT INDICATOR FOR MOLTEN STEEL TEMPERATURE

Michael Tinkham, Ripon, Wis., and Dayton G. Harris, Massillon, Ohio, assignors to Republic Steel Corporation, Cleveland, Ohio, a corporation of New Jersey Application May 18, 1948, Serial No. 27,716

6 Claims. (Cl. 177—311)

1

This invention relates to pyrometers, especially to pyrometers for high temperatures such as the thermocouple type immersed pyrometers for molten steel.

It is an object of the invention to prevent faulty indications and to avoid reliance on thermocouples which are defective whether by reason of an open circuit or a short circuit.

A further object of the invention is to indicate operativeness of thermocouples and to indicate whether pyrometers for molten metal are at adequate temperatures for immersion in the metal, the temperature of which is to be measured.

Still another object of the invention is to enable the temperature of molten steel and other high melting point liquid metals to be measured rapidly and without unnecessarily long heating periods for the pyrometer head. Likewise, it is an object to enable temperatures of molten metals to be measured without danger of solidification of any portion of the metal by immersion of a cold pyrometer head.

Other and further objects, features and advantages of the invention will become apparent as the description proceeds.

In carrying out the invention in accordance with a preferred form thereof, in connection with a self-balancing potentiometer type thermocouple pyrometer, the magnitude of the unbalance between the thermocouple voltage and the pyrometer voltage is observed to ascertain whether or not the thermocouple is defective. If a voltage output is obtained from the circuit including the thermocouple and the potentiometer, this indicates that there is no open circuit. The pyrometer head containing the thermocouple is then held adjacent the object, the temperature of which is to be measured. For example, in the case of measuring the temperature of molten steel the pyrometer head is held over the pool of molten metal to enable it to approach the temperature of the molten steel. As the temperature of the thermocouple gradually rises, its voltage output approaches that equaling the minimum voltage output of the potentiometer. This minimum potentiometer voltage output corresponds to the minimum temperature of which the apparatus is capable of measurement. Thus as the temperature of the thermocouple rises, the unbalance output falls to zero, indicating that the voltage output of the thermocouple has reached the minimum voltage of the potentiometer. Further temperature and voltage rise are compensated by the self-balancing feature of such apparatus. Having observed that the thermocouple has reached the requisite temperature, as indicated by the disappearance of unbalance output, the pyrometer head containing the thermocouple is immersed in the molten steel and the apparatus indicates the temperature thereof.

A better understanding of the invention will be afforded by the following detailed description considered in conjunction with the accompanying drawing, in which Fig. 1 is a schematic diagram including an electric circuit diagram of pertinent features of the novel apparatus which may be employed in carrying out the method of the invention; and Fig. 2 is a schematic diagram illustrating the procedure followed in practicing the invention.

Referring to the drawings, in carrying out the invention a self-balancing potentiometer type thermocouple pyrometer may be employed. For example, the invention may be carried out in connection with a "Brown Electronik Potentiometer Pyrometer Circular Chart Recorder." The basic elements of such a recorder are represented schematically in Fig. 1 of the drawing within the dash line rectangle 11. Such a recorder as designed for measuring the temperature of molten steel includes a thermocouple 12 connected in opposition to a self-balancing potentiometer 13 and a converter 14. The converter is arranged to produce an alternating current proportional to the difference in potential of the thermocouple 12 and the output of the potentiometer 13. The arrangement is such that the phase relationship of the voltage output of the converter 14 depends upon the polarity of the voltage difference, which is the unbalance between the outputs of the thermocouple 12 and the potentiometer 13. In order to obtain adequate power for operating an indicating pointer or a pen for marking a record chart, such pyrometers include a multi-stage amplifier. For example, there may be a voltage amplifier comprising a first stage 15 which is Class A1, second and third stages 16 and 17 which are Class AB2, and a power amplifier stage 18. For balancing the potentiometer 13 and operating an indicating pointer 19 as well as the chart pen or stylus, not shown, a balancing motor 21 is provided in the apparatus 11.

The indicating pointer 19 is mounted within a chart case or housing 22 and cooperates with a suitable scale 23. Where the apparatus is used for measuring the temperature of molten steel, the apparatus is provided with a suppressed zero and the scale 23 is calibrated only within the desired operating range, such as from 2200 to 3200 degrees Fahrenheit, as indicated by the scale numerals 22 to 32 shown in the drawing.

The potentiometer includes a source of direct-current such as a cell or battery 24 across which is connected a resistor including three elements in series. These elements comprise a zero suppression resistor 25, a slide wire or potentiometer element 26 and an upper range suppression resistor 27. A sliding brush or contact 28 is provided which is adapted to be driven back and forth along the slide wire 26 by the motor 21. The suppression resistors 25 or 27 remain in circuit for any position of the brush 28. For the sake of simplicity in the drawing, a mechanical connection between the motor 21 and the sliding brush or contact 28 is indicated schematically by means of a broken line 29. Likewise, the mechanical connection between the motor 21 and the temperature indicating pointer 19 is represented schematically by a broken line 31.

The balancing motor 21 is a conventional type of two-phase alternating current motor known for such purposes having one-phase connection represented by a pair of terminals 32 and a second phase connection represented by a pair of terminals 33. As will be understood by those skilled in the art, the characteristics of the motor 21 are such that it does not rotate when the terminals 32 alone are energized, but, continuously rotates when the second terminals 33 also are energized with a voltage having a component in quadrature with the voltage applied to the terminals 32. The terminals 32 are connected to a suitable source of alternating current such as a 115 volt, 60-cycle, central station line represented by terminals 34.

The converter 14 is in the form of a vibrator having an armature 35 actuated by a coil 36 connected to input leads 37 to the same alternating current source 34 and a permanent magnet 37 cooperating with the magnetization of the alternating current coil 36 to vibrate the armature 35. Cooperating with the armature 35 are a pair of stationary contacts 38 and 39 connected to opposite ends of a primary winding 41 of a transformer 42. The transformer winding 41 has a mid-terminal 43 connected through a conductor 44 to one terminal, e. g., the positive terminal 45 of the thermocouple 12. In this case the negative terminal 46 is connected through a conductor 46A to the negative terminal 47 of the battery 24. The terminal 47 is also the negative end terminal of the zero suppression resistor 25. The transformer 42 has a secondary winding 48 which serves as the output winding of the converter 14. As will be apparent, the magnitude and phase of the voltage appearing in the output winding 48 are determined by the extent and direction of unbalance between the thermocouple 12 and the potentiometer 13, the potentiometer voltage being the voltage between the contact 28 and the negative terminal 47.

Owing to the fact that the voltage amplifier stages 16 and 17 are designed for Class AB₂ operation and relatively large voltage output is obtained from the converter circuit 14 and the Class A₁ stage 15, there is a tendency for voltage limiting or clipping effects to take place in the amplifiers 16 and 17. Sufficient gradation of the magnitude of voltage output in proportion to the potentiometer unbalance is not obtained if the voltage outputs of the stages 16 and 17 are observed in order to extend the effective range of the thermocouple 12. Accordingly, the observation is made at the output of the first stage, viz., the stage 15 which is connected Class A₁ so that the grid of the vacuum tube included in the stage 15 is never driven positively. However, in order to obtain sufficient voltage output for operation of a suitable indicating device, such as a lamp bulb 49 for example, separate amplifier stages represented by vacuum tubes 51 and 52 are provided which do not form a part of the conventional self-balancing potentiometer pyrometer 11. The input to the stage 51 is taken from the output of the pyrometer amplifier stage 15, which will be understood by those skilled in the art. The output of the stage 15 is the plate connection thereof, the vacuum tube internal connection of the stage 15 being but fragmentarily indicated in dotted lines.

Although my invention is not limited to the use of specific vacuum tubes or circuit values, I found that satisfactory results may be obtained by employing the type 6SF5 triode as the stage 51 and the type 6V6 beam power amplifier as the stage 52. To assure complete absence of any limiting effects in the stage 51, the voltage output of the pyrometer stage 15 is preferably supplied to the tube 51 through a voltage divider taking the form of a coupling condenser 53 and a grid leak 54. The electrical values of the elements 53 and 54 are chosen such that as much voltage drop takes place in the condenser 53 as in the resistor 54. For example, when a 60-cycle converter is employed the coupling condenser 53 may have a capacity of .02 microfarad and the resistor 54 may have a resistance of 1 megohm. In order to provide adjustability in the range of temperature to which the indicator lamp 49 responds, the resistor 54 is practically in the form of a potentiometer having a sliding contact 55 serving as the input or grid connection to the tube 51. The tube 51 is provided with a cathode resistor 56 having a resistance of 5600 ohms, e. g., and a load resistor 57 having a resistance of one-half megohm, e. g., connected to a suitable power supply 58 represented by terminals B+ and B—. Suitable coupling elements such as a condenser 59 of .002 microfarad and a one-half megohm grid leak 61 are provided between the tube 51 and the tube 52.

The tube 52 is provided with cathode bias taking the form of 500 ohm cathode resistor 62 and a 20 microfarad by-pass condenser 63 for example. The tube 52 is coupled to the indicator lamp 49 by a plate choke 64 having an inductance of 10 henries, for example, and a coupling condenser 65 having a capacity of 1 microfarad, e. g. The indicator lamp 49 may, for example, consist of a 6-watt, 115-volt lamp bulb.

It will be understood that the invention is not limited to the use of a luminous indicator or to the particular form of indicator shown, and that the specific characteristics and particular constants of the amplifier stages 51 and 52 are dependent on the type of indicator employed. Furthermore, the indicator 49 may be separate from the chart case or housing 22. However, we found that the convenience and usability of the indicator is enhanced by providing a glass covered opening 66 in the front face of the chart casing 22 and mounting a lamp 49 behind the opening 66.

It will be understood that the thermocouple 12 is encased in a suitable pyrometer head or bulb 67 (shown in Fig. 2) or the like, for protection where the apparatus is to be employed for the measurement of molten steel temperatures. Such a head 67 is mounted at the end of a rod 68 adapted to be thrust through a window 69 in a steel melting furnace or crucible 71 containing a pool of molten metal such as steel 72.

Obvious difficulties would be involved if the rod 68 and the pyrometer head 67 were thrust into the molten pool 72 while the pyrometer head 67 was at room temperature. Such action might result in solidification of steel upon the end of the rod 68 making it impossible to handle and also interfering with the proper characteristics of the molten steel and the melting process. Accordingly the pyrometer head 67 and the rod 68 are held in the position of Fig. 2 above the pool of molten steel 72 for a sufficient period of time for the thermocouple 12 within the head 67 to reach an adequate temperature.

Owing to the presence of the zero suppression resistor 25 in the potentiometer 13, the minimum voltage output of the potentiometer 13 cannot be less than a predetermined voltage when the contact 28 is at the minimum voltage position, i. e., at the extreme left end of the slide wire 26. Consequently, with a zero voltage output from the thermocouple 12, the output of the converter 14 cannot be less than a predetermined value which is 13 millivolts in the case of the Brown Electronik Pyrometer, described by way of illustration.

The condition of the thermocouple 12 is readily observed, therefore, by observing the indicator lamp 49 preparatory to observing the temperature indication of the pointer 19. The pointer 19 cannot read less than 2200 degrees in any event, owing to the fact that the zero is suppressed regardless of the temperature of the thermocouple 12. If the thermocouple 12 has become defective so that its circuit is open, the circuit to the primary winding 41 of the transformer 42 will also be open and there will be no output from the converter 14 or the amplifier stage 15 and the lamp 49 will remain dark. If the lamp 49 remains dark the operator is apprised that the apparatus is defective and will take steps to have a repair made before an attempt is made to read the temperature.

Having satisfied himself that there is no open circuit and observing a full brilliancy of the lamp 49, the operator will hold the pyrometer head 67 in the position shown in Fig. 2 above the molten pool of steel 72. In case the thermocouple 12 should be short-circuited there will be a complete circuit to the input winding of the converter 14 and full output therefrom proportional to the voltage between the terminal 47 and the contact 28 of the potentiometer 13. Under these circumstances the lamp 49 will remain at full brilliancy, regardless of the length of time that the thermocouple is held above the molten steel 72. The operator is again apprised that the thermocouple 12 is defective and that a reliable reading will not be obtained even if the thermocouple 12 is immersed in the pool 72. However, if the thermocouple 12 is sound, the lamp 49 will fade gradually as the temperature of the thermocouple rises, owing to its being heated by its position above the pool 72. As the thermocouple temperature rises its voltage output will rise until it reaches a predetermined value, e. g., 13 millivolts which is the minimum voltage output of the potentiometer 13 corresponding to 2200 degrees in the case of the particular apparatus described. As the thermocouple 12 approaches this temperature the unbalance in the circuit of the potentiometer and the thermocouple approaches a minimum and the brilliancy of the lamp 49 will gradually fade.

As soon as the lamp has become dark after having faded from full brilliancy, the operator will be apprised that the thermocouple head 67 has reached an adequate temperature and may be immersed safely in the molten pool 72. As the temperature of the thermocouple 12 rises further unbalance in the opposite direction will take place causing a reversal in phase of the voltage applied in the terminals 33 to the balancing motor 21 and the contact 28 will be driven to the right along the slide wire 26. Thereafter the motor 21 will keep the potentiometer voltage output in balance with the thermocouple output and the voltage applied to the lamp 49 will remain at zero and the lamp will remain dark, plus showing the operator that reliable indications of temperature are being obtained by reading the position of the pointer 19 on the scale 23. If the pyrometer head 67 should become ruptured and the leads to the thermocouple 12 short-circuited an unbalance will immediately take place which cannot be corrected by any position of the balancing motor 21, and the lamp 49 will abruptly assume full brilliancy indicating to the operator that reliable temperature readings are no longer being obtained.

If it is desired to observe the condition of a thermocouple under circumstances where the minimum temperature to which the thermocouple will be subjected in the molten pool is different from 2200 degrees, the lamp fading circuit is adjusted by adjustment of the contact 55 of the resistor 54 in the input to the vacuum tube 51 until the lamp 49 fades at the desired thermocouple temperature.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

We claim:

1. In a self-balancing suppressed-zero thermocouple type molten steel pyrometer having a thermocouple, a potentiometer with a zero-suppression resistor in series therewith, a converter responsive to unbalance between thermocouple and potentiometer voltage, and a multistage amplifier with a first stage which is a class A voltage amplifier, a thermocouple condition indicator comprising in combination an indicator lamp, and an indicator amplifier interposed between said indicator lamp and said first amplifier stage with a voltage divider in the input to said indicator amplifier, whereby an open circuited thermocouple leaves the lamp dark, a short circuited thermocouple produces continuous full brilliancy of the lamp, and a sound thermocouple produces full lamp brilliancy fading as the thermocouple is brought up to the full temperature for immersion in molten steel.

2. The method of employing a suitably encased thermocouple for the measurement of the temperature of molten steel in connection with a self-balancing suppressed-zero thermocouple type of pyrometer having a thermocouple potentiometer with a zero-suppression resistor in series therewith, a converter responsive to unbalance between thermocouple and potentiometer voltage, and a multistage amplifier with a first stage which is a class A voltage amplifier, which method comprises the steps of amplifying the output of the said first stage voltage amplifier, observing the strength of the amplified output, holding the thermocouple over the molten steel, and immersing the thermocouple in the steel when the said amplified output falls to a predetermined fraction of its maximum value.

3. The method of employing a suitably encased thermocouple for the measurement of the temperature of molten steel in connection with a self-balancing suppressed-zero thermocouple type of pyrometer having a thermocouple potentiometer with a zero-suppression resistor in series therewith, and output terminals supplying an output voltage dependent upon unbalance between thermocouple and potentiometer voltage, and which method comprises the steps of observing the strength of the output voltage, holding the thermocouple over the molten steel, and immersing the thermocouple in the steel when the said output falls to a predetermined fraction of its maximum value.

4. In a self-balancing suppressed-zero thermocouple type molten steel pyrometer having a thermocouple, a potentiometer with a zero-suppression resistor in series therewith, and a converter responsive to unbalance between thermocouple and potentiometer voltages, a thermocouple indicator comprising in combination a voltage responsive device, and an indicator amplifier interposed between said converter and said voltage responsive device with a voltage divider in the input to said indicator amplifier for adjusting minimum response, whereby an open circuited thermocouple leaves the voltage responsive device deenergized, a short circuited thermocouple produces continuous full energization of the voltage responsive device, and a sound thermocouple produces such full energization, falling as the thermocouple is brought up to the full temperature for immersion in molten steel.

5. In a self-balancing suppressed-zero thermocouple type molten steel pyrometer having a thermocouple, a potentiometer with a zero-suppression resistor in series therewith, and output terminals supplying a voltage variable according to unbalance between thermocouple and potentiometer voltage, a thermocouple indicator comprising in combination a voltage responsive device, and connections interposed between said output terminals and said voltage responsive device, whereby an open circuited thermocouple leaves the voltage-responsive device de-energized a short circuited thermocouple produces continuous full energization of the device, and a sound thermocouple produces full energization falling as the thermocouple is brought up to the full temperature for immersion in molten steel.

6. In a self-balancing suppressed-zero thermocouple type molten steel pyrometer having a thermocouple, a potentiometer with a zero-suppression resistor in series therewith and means responsive to unbalance between thermocouple and potentiometer voltage, a thermocouple condition indicator comprising in combination a current-responsive apparatus responsive to said unbalance-responsive means, whereby an open circuit thermocouple leaves said indicating apparatus unenergized, a short-circuited thermocouple produces maximum energization thereof, and a sound thermocouple produces initial maximum energization falling to a minimum as a thermocouple is brought up to a minimum temperature for which it is adapted to operate.

MICHAEL TINKHAM.
DAYTON G. HARRIS.

No references cited.